US012806642B2

(12) United States Patent
Hegemann et al.

(10) Patent No.: US 12,806,642 B2

(45) Date of Patent: Nov. 24, 2026

(54) FOAM DISPENSER FOR FOAMABLE SOLUTIONS

(71) Applicant: Bode Chemie GmbH, Hamburg (DE)

(72) Inventors: Christine Hegemann, Hamburg (DE); Christian Langlotz, Hamburg (DE); Stefan Kuboteit, Seevetal (DE); Jana Kuboteit, Seevetal (DE); Felix Krause-Kyora, Hamburg (DE)

(73) Assignee: BODE CHEMIE GMBH, Hamburg (DE)

( * ) Notice: Subject to any disclaimer, the term of this patent is extended or adjusted under 35 U.S.C. 154(b) by 162 days.

(21) Appl. No.: 18/723,798

(22) PCT Filed: Nov. 28, 2022

(86) PCT No.: PCT/EP2022/083475

§ 371 (c)(1),
(2) Date: Jun. 24, 2024

(87) PCT Pub. No.: WO2023/117312

PCT Pub. Date: Jun. 29, 2023

(65) Prior Publication Data

US 2025/0050363 A1 Feb. 13, 2025

(30) Foreign Application Priority Data

Dec. 23, 2021 (EP) .................................... 21217300

(51) Int. Cl.
*B05B 11/04* (2006.01)
*B05B 11/00* (2023.01)

(52) U.S. Cl.
CPC ........ *B05B 11/046* (2013.01); *B05B 11/0059* (2013.01); *B05B 11/043* (2013.01)

(58) Field of Classification Search
CPC . B05B 11/046; B05B 11/0059; B05B 11/043; B05B 11/0037; B05B 11/0032
See application file for complete search history.

(56) References Cited

U.S. PATENT DOCUMENTS 3,422,993 A 1/1969 Boehm
4,531,659 A * 7/1985 Wright .................... A47K 5/14 222/211

(Continued)

FOREIGN PATENT DOCUMENTS

DE 3923284 C1 8/1990
DE 102005060181 A1 6/2007

(Continued)

OTHER PUBLICATIONS

Office Action issued by the European Patent Office on Dec. 5, 2025 in corresponding EP Patent Application No. 21217300.9.

(Continued)

*Primary Examiner* — Bob Zadeh

(74) *Attorney, Agent, or Firm* — Carter, DeLuca & Farrell LLP

(57) ABSTRACT

The disclosure relates to a foam dispenser which includes a plastic bottle made of a flexible plastic having a bottle opening, a closure cap that seals the bottle opening and has a dispensing opening for a foam, a foam-generating device for foaming a solution including a chamber having at least one wall, at least one inlet for air in a wall of the chamber, and at least one inlet for liquid in a wall of the chamber, and at least one porous body that is arranged in the chamber, the foam-generating device being arranged in or connected to the closure cap, and a riser pipe that is arranged inside the bottle and is connected to an inlet.

19 Claims, 6 Drawing Sheets

(56) References Cited

U.S. PATENT DOCUMENTS

| | | | | |
|---|---|---|---|---|
| 5,037,006 A * | 8/1991 | Kock | B05B 7/0037 222/211 |
| 5,298,068 A | 3/1994 | Giesemann | |
| 5,467,898 A * | 11/1995 | Hori | B05B 7/0018 239/327 |
| 6,071,580 A * | 6/2000 | Bland | B29C 44/505 521/142 |
| 6,371,606 B1 * | 4/2002 | Free | B41J 2/17513 521/52 |
| 6,394,315 B1 * | 5/2002 | Banks | B05B 11/043 222/211 |
| 2004/0060945 A1 * | 4/2004 | Cater | B05B 11/043 222/145.5 |
| 2004/0074930 A1 * | 4/2004 | Yquel | B65D 83/32 222/402.1 |
| 2008/0277425 A1 | 11/2008 | Grasser | |
| 2014/0061247 A1 * | 3/2014 | Arminak | B05B 7/005 29/469 |
| 2021/0205183 A1 * | 7/2021 | Kang | A61K 8/0204 |
| 2025/0050363 A1 * | 2/2025 | Hegemann | B05B 11/0059 |

FOREIGN PATENT DOCUMENTS

| | | | | |
|---|---|---|---|---|
| DE | 60 2004 004013 T2 | 10/2007 | |
| DE | 69837332 T2 | 11/2007 | |
| EP | 4667118 A1 * | 12/2025 | B05B 11/0059 |
| GB | 1478607 A | 7/1977 | |
| JP | H07215352 A * | 8/1995 | |
| JP | H0811955 A * | 1/1996 | |
| JP | H1029652 A | 2/1998 | |
| WO | WO-2018064118 A1 * | 4/2018 | B05B 1/3436 |

OTHER PUBLICATIONS

International Search Report issued in corresponding International Application No. PCT/EP2022/083475 dated Mar. 15, 2023, pp. 1-4, English Translation.

* cited by examiner

FOAM DISPENSER FOR FOAMABLE SOLUTIONS

CROSS REFERENCE TO RELATED APPLICATIONS

The present application is a national stage application of International Application No. PCT/EP2022/083475, filed Nov. 28, 2022, which claims priority to European Patent Application No. 21217300.9, filed Dec. 23, 2021, the entire contents of which are incorporated herein by reference in their entirety.

TECHNICAL FIELD

The invention relates to a foam dispenser. This comprises a plastic bottle made of a flexible plastic having a bottle opening, a closure cap that seals the bottle opening and has a dispensing opening for a foam, a foam-generating device for foaming a solution, said device comprising a chamber having at least one wall, at least one inlet for air in a wall of the chamber, and at least one inlet for liquid in a wall of the chamber, and at least one porous body that is arranged in the chamber, the foam-generating device being arranged in or connected to the closure cap, and a riser pipe that is arranged inside the bottle and is connected to an inlet.

BACKGROUND

Disinfectants or cleaning agents are often alcoholic solutions, since alcohols have a good microbiocidal effect depending on the chain length. Such products are available as a solution, gel or foam. Alcoholic solutions are difficult to foam, as alcohol is a defoaming agent. To generate a foam in hand-operated dispensers or automatic dispensers, a foam-generating device is used when foaming alcohol-based products, which ensures that a foam is produced when the liquid and air are mixed. The dispenser systems, especially in the case of mechanical dispensers, often consist of a plurality of sensitive components and are thus complex to manufacture and more expensive.

GB 1 478 607 A describes a hand-operated device for producing and dispensing foam using a bottle with a riser pipe. The bottle contains a rigid porous body in which liquid and air are mixed. The air flow is regulated via a valve.

SUMMARY

The object of the invention is to provide a hand-operated foam dispenser which overcomes the disadvantages known from the prior art and, in particular, can be produced inexpensively with few components and enables the foaming of alcoholic solutions.

The object is solved according to the invention by a foam dispenser for foamable products according to patent claim 1.

Further embodiments are the subject of the subclaims or are described below.

The foam dispenser according to the invention comprises

- a plastic bottle made of flexible plastic having a bottle opening,
- a closure cap that seals the bottle opening and has a dispensing opening for a foam,
- a foam-generating device for foaming a solution, comprising
  - a chamber having at least one wall, at least one inlet for air in a wall of the chamber and at least one inlet for liquid in a wall of the chamber, and
  - at least one porous body that is arranged in the chamber,
- the foam-generating device being arranged in or connected to the closure cap,
- a riser pipe that is arranged inside the bottle and is connected to an inlet.

The porous body consists of an open-cell foam material and the open-cell foam material in the chamber has a density of more than 0.03 g/cm$^3$. The density is determined by measuring the outer dimensions of the porous body, determining the weight of the porous body and calculating the density from the weight and volume. The measurement or determination of the outer dimensions of the porous body is based on its dimensions in the chamber.

According to the invention, a porous body is understood to be at least one porous body, i.e. when a porous body is described, exactly one porous body or a plurality of porous bodies are included.

The foam dispenser according to the invention is a manual foam dispenser which is hand-operated, i.e. in which the foam is generated by squeezing the bottle by hand. The plastic bottle is thus made of a flexible plastic so that it can be squeezed. The plastic bottle is preferably made of polypropylene (PP), polyethylene terephthalate (PET), low density polyethylen (LDPE), high density polyethylen (HDPE) or a mixture thereof, particularly preferably of HDPE and LDPE.

The foam dispenser according to the invention preferably contains an alcoholic or non-alcoholic mixture, which is typically a solution. The mixture contains at least one surfactant or a surface-active substance that acts as a foamable substance. The surfactant is preferably a silicone surfactant. Preferably, the surfactant or the surface-active substance is present in the mixture in an amount of 0.2 to 5% by weight, particularly preferably 0.2 to 2.5% by weight. The foam dispenser according to the invention can be used for cleaning agents for skin and hands, for surfaces or instruments, or for disinfectants for skin or hands, for surfaces or instruments, for wound cleaning agents or wound disinfectants or for cosmetic agents, such as hair or skin cleaning agents or hair or skin care products.

The plastic bottle preferably contains an alcoholic solution, particularly preferably an alcoholic disinfectant. The alcoholic disinfectant preferably contains

- 70%-90% by weight of at least one monohydric alcohol with 1 to 4 carbon atoms, preferably ethanol,
- 9.5%-20% by weight of water,
- 0.2%-2.5% by weight of at least one surfactant, preferably silicone surfactants, a surface-active substance or mixtures thereof,
- optionally 0%-2.5% by weight of foam stabilizers,
- 0.2%-2.5% by weight of excipients, for example skin care substances, refatting agents, moisturizers, pH regulators or mixtures thereof and
- optionally 0-5% by weight of other active ingredients, for example quaternary ammonium compounds (QAV), substances similar to QAV.

The plastic bottle can also contain a low-alcohol solution, such as a surface disinfectant. The low-alcohol solution preferably contains

- 10%-30% by weight of at least one monohydric alcohol with 1 to 4 carbon atoms,
- 69.8%-89.8% by weight of water,
- 0.2%-2.5% by weight of at least one surfactant, one surface-active substance or mixtures thereof,
- optionally 0%-2.5% by weight of foam stabilizers, 0%-2.5% by weight of excipients, for example skin care substances, refatting agents, moisturizers, pH regulators or mixtures thereof and optionally 0-2.5% by weight of other active ingredients, for example quaternary ammonium compounds (QAC), QAC-like substances.

Alternatively, the plastic bottle can contain an aqueous solution, such as a soap formulation.

The aqueous solution preferably contains

0% alcohol by weight, 87.5%-99% by weight of water, 0.2%-5% by weight of at least one surfactant, a surface-active substance or mixtures thereof, optionally 0%-2.5% by weight of foam stabilizers, 0%-5% by weight of excipients, for example skin care substances, refatting agents, moisturizers, pH regulators or mixtures thereof and optionally 0-2.5% by weight of other active ingredients, for example quaternary ammonium compounds (QAC), QAC-like substances.

To foam an alcoholic composition, it must be mixed with foamable substances, i.e. surfactants or surface-active substances. Alcohols disrupt the surface tension and are also used as defoamers. The foaming of an alcohol-containing composition thus requires corresponding chemical excipients and additionally further physical/mechanical means, such as a foam dispenser which, according to the invention, has a chamber having at least one porous body in which liquid and air can be mixed to generate foam.

The open-cell foam material is preferably made of a polymer material, particularly preferably polyurethane (PUR) or acrylonitrile butadiene gum, also known as nitrile butadiene rubber (NBR).

The open-cell foam material in the chamber has a density of more than 0.03 g/cm$^3$. The density refers to the density of the porous body placed in the chamber, which body can be uncompressed or compressed. For an uncompressed porous body, the density of the uncompressed foam in the chamber is specified. For a compressed porous body, the density of the compressed foam in the chamber is specified. Preferably, the foam material placed in the chamber has a density of at least 0.035 g/cm$^3$, particularly preferably at least 0.045 g/cm$^3$. Further preferably, the foam material placed in the chamber has a density of at most 0.08 g/cm$^3$, preferably of at most 0.06 g/cm$^3$. The foam material in the chamber preferably has a density of more than 0.03 g/cm$^3$ and no more than 0.06 g/cm$^3$.

In the uncompressed state, the foam material preferably has a number of pores (=number of pores along a straight line per linear inch) of 50 to 130 pores/inch, preferably 60 to 100 pores/inch, particularly preferably 60 to 80 pores/inch, for example around 70 pores/inch. The cell count is preferably determined microscopically.

The foam material preferably has a mean pore size of 0.3 mm to 0.9 mm in the uncompressed state, measured according to ASTM D 3576-2004, preferably from 0.4 mm to 0.8 mm.

In a preferred embodiment, the porous body is compressed in the chamber, wherein the porous body is preferably compressed by 10% to 50% of the volume of the uncompressed body, particularly preferably by 15% to 50%, more preferably by 35% to 50% and most preferably by 35% to 40%. Compression increases the density of the foam and can also change the shape of the foam's pores. Both the increase in density and the change in shape can have the effect that the solution can be foamed better.

For example, the chamber can have a volume of 1 cm$^3$ to 5 cm$^3$, preferably 1 cm$^3$ to 3 cm$^3$ and particularly preferably 1 cm$^3$ to 2 cm$^3$. In particular, the chamber has a volume of 1.4 cm$^3$ to 2 cm$^3$. The porous body or the total number of porous bodies preferably fills the volume of the chamber to at least 80%, more preferably to at least 85%, even more preferably to at least 90%, particularly preferably to at least 95% and in particular essentially completely.

The porous body is preferably fixed to the wall of the chamber, preferably by being clamped in its position in the chamber by contact with the wall. This ensures that the liquid has to flow through the pores of the foam and prevents the porous body from floating on the liquid. The porous body is particularly preferably in full contact with the side walls of the chamber, so that the liquid must flow through the foam material when flowing through the chamber and no liquid can flow past the porous body. In this case, the porous body has the same cross-section as the chamber. The porous body preferably has a height that is at least half the length of the chamber, since a particularly good foam is produced if the liquid and air have a sufficient distance to travel in which they can mix in the pores of the foam material.

In one embodiment, the chamber is at least partially cylindrical and the porous body is cylindrical. If the chamber contains a plurality of porous bodies, these can, for example, be shaped as partial pieces of a cylinder, e.g. as two half cylinders or as pie pieces, which in total again have the shape of a cylinder.

When using a plurality of porous bodies, all porous bodies are preferably made of the same foam material. This has the advantage that the foam dispenser is easier and cheaper to manufacture, as there is no need to keep different materials in stock. In addition, the same mixing effect is achieved in all areas and a uniform foam is produced if the porous bodies are made of the same material.

The chamber, which is preferably at least partially cylindrical, preferably has a chamber base and at least one chamber wall, which extends from the chamber base in the direction of the top side of the closure cap, wherein at least one inlet is arranged in the chamber base and at least one inlet is arranged in a chamber wall. If the chamber base is circular, the chamber has a curved chamber wall.

In one embodiment, the chamber has only a single inlet in the chamber base, which inlet is connected to the riser pipe and preferably forms the inlet for air when used upside down. An air chamber can be arranged in a connecting piece between the end of the riser pipe and the inlet, from which air chamber the air flows through the inlet into the chamber.

The chamber preferably has at least two, preferably three to six, particularly preferably three or four inlets in the chamber wall or the side wall of the chamber, wherein the inlets are preferably arranged evenly spaced apart and preferably form the inlet for liquid when used upside down.

The air inlet is the inlet that is connected to an air reservoir in the bottle during use. The liquid inlet is the inlet that is connected to a liquid reservoir during use. The riser pipe, which is arranged inside the bottle, is preferably connected to an inlet in the base of the chamber and preferably forms the inlet for air.

In a preferred embodiment, the chamber is at least partially designed as a double-walled hollow cylinder. The double-walled hollow cylinder has an inner and an outer cylinder, which are arranged concentrically to each other in the overlapping area and are preferably offset relative to their longitudinal axis or have different lengths, so that the area at the chamber base is only single-walled. The porous body is arranged in the inner cylinder. In this embodiment, the inlets in the side wall of the chamber are preferably arranged only in the outer cylinder, particularly preferably only in the lower, non-double-walled part of the chamber. The inner hollow cylinder can be connected to the closure cap and, for example, be formed in one piece with the closure cap.

The embodiment of the chamber as a double-walled hollow cylinder is particularly advantageous because the liquid flow is directed through the double-walled cylinder. The liquid first enters the outer of the two hollow cylinders and thus the foam-free area and is then transported to the lower opening of the inner hollow cylinder. This allows it to flow into the porous body from below so that the entire length of the porous body can be utilized for foam generation. Since the foam material is fixed in the inner cylinder, the foam dispenser is easier to assemble, since the porous body is already in position when the closure cap is screwed or clamped and does not have to be fixed during the screwing or clamping process. It is also easy to replace the porous body by replacing only the inner cylinder of the chamber or the closure cap connected to the inner cylinder.

The foam dispenser according to the invention can be used to generate foam either upside down, i.e. with the bottle turned upside down with the bottle base pointing upwards, or upright, with the bottle base pointing downwards. Upwards means vertically upwards towards the ceiling and downwards means vertically downwards towards the floor. The bottle can also be held at a slight angle during use, this is also included in upside down and upright.

When generating foam, if the bottle is closed, the outlet opening of the bottle is opened first, e.g. by opening a hinged lid, pulling off a protective cap or pulling up a pull closure. The bottle is a. turned upside down and the bottle body is squeezed or
b. the bottle is held upright and squeezed.

This generates foam, which exits through the outlet opening in the closure cap and is collected with the other hand. To foam the liquid, the porous body made of open-cell foam material is located inside the chamber, which foam material has cavities in which air and liquid are mixed together to generate a foam. Optionally, a part of the chamber in which at least one inlet is located is empty and does not contain a porous body. Air and liquid are preferably already partially mixed after entering the chamber before they are transported premixed into the porous body.

If the bottle is used upside down, foam is generated as follows:

The chamber having the porous body has one or more inlets, which lie below the liquid level inside the bottle in the upside down position. The riser pipe is located at the top of the chamber when the bottle is inverted and ends in the air space of the bottle above the liquid level. When pressure is applied to the bottle body, the air is forced down through the riser pipe. At the same time, the liquid from the bottle is sucked into the chamber through the inlets due to the different pressure ratios during this process. Air and liquid are mixed in the pores of the open-cell foam material and the foam is discharged downwards as foam through the outlet opening.

When using the bottle in an upright position, foam is generated as follows:

The chamber having the porous body has one or more inlets that lie above the liquid level inside the bottle. The riser pipe, which is located at the base of the chamber in the upright position, extends to the base of the bottle. When pressure is applied to the bottle body, the liquid is forced upwards through the riser pipe, wherein the different pressure ratios during this process cause the air to be sucked in from the headspace of the bottle. Air and liquid are mixed together in the pores of the open-cell foam material and the resulting foam is discharged upwards out of the outlet opening.

In the case of the upright position, it is advantageous if the opening for the foam outlet is not directed vertically upwards, but the foam is discharged via a spout having a lateral direction.

Since the foam dispenser is hand-operated, the bottle is preferably a size that is easy to hold with one hand. The bottle has a volume of 50 ml to 500 ml, for example. Preferably, the bottle has a volume of 100 ml to 250 ml, in particular 100 ml to 150 ml.

In a bottle having a volume of less than 500 ml, the inlet for air preferably has a diameter of 1.0 mm to 1.4 mm. The inlet for liquid preferably has a diameter of 0.6 mm to 0.8 mm.

The ratio of the size of the inlet opening(s) for air to the size of the inlet opening(s) for liquid is preferably 1:0.9 to 1:1.5, particularly preferably 1:0.9 to 1:1.1. If the ratio of air inlets to liquid inlets is approximately 1:1, as in the last-mentioned preferred embodiment, the foam generation works both upside down and upright.

The ratio of the total size of air inlets and liquid inlets has an influence on foam generation. The diameter of the inlet opening for air must not be too large and the air content must not be too high, otherwise good foam will not be formed.

One embodiment of the foam-generating device is designed as an insert with a flange. The flange is placed on the upper edge of the bottle neck, with the closure cap attached to the neck of the bottle and holding the insert in place.

In one embodiment, the closure cap and foam-generating device are formed in one piece and the closure cap with the foam-generating device is attached to the neck of the bottle, preferably screwed on or crimped.

In one embodiment, the foam-generating device is designed as an insert which is snapped into the closure cap, glued to the closure cap or welded to the closure cap, wherein the closure cap is attached with the insert to a neck of the bottle, preferably screwed on or crimped.

The closure cap can have a conventional design and can, for example, comprise a hinged lid or a protective cap or be designed as a pull closure. It also usually has a fastening device with which it is attached to the neck of the bottle, e.g. a screw thread or a crimp closure.

The foam dispenser according to the invention can be designed as a disposable product for disposal after emptying the liquid or as a refillable reusable product. In a reusable product, both the alcoholic or non-alcoholic solution can be refillable and/or the porous body can be replaceable.

The foam dispenser according to the invention can be manufactured cost-effectively, since it is composed of only a few components. Thanks to the foam-generating device, foam can also be generated with alcoholic solutions and both with upside down and upright application. According to the invention, foam is generated using a hand-operated foam dispenser with few components. Due to the compact design without a motor, electrical parts or valves for control, cost-effective manufacture is possible and handling is easy, intuitive and trouble-free. An alcoholic disinfectant can be applied as a foam using the foam dispenser according to the invention. Due to its consistency, foam has the advantage of being easier to dose and distribute than liquids. While a liquid hand sanitizer, for example, flows quickly from the hand when it is dispensed and thus not only gets on the hand but also on the floor, foam flows more slowly and can thus be spread more easily and drip-free on the hands.

Another object of the invention is the use of a foam dispenser according to the invention for foaming an alcoholic solution, preferably an alcoholic disinfectant.

Another object of the invention is a method for foaming an alcoholic solution, preferably an alcoholic disinfectant, comprising the steps of

- providing a foam dispenser according to the invention, wherein the foam dispenser contains the alcoholic solution,
- manually squeezing the bottle of the foam dispenser so that an alcoholic foam can be obtained.

Measuring Methods

Density

To determine the density of the uncompressed foam, first the outer dimensions of a foam material sample are measured and the volume is calculated from the outer dimensions. The weight of the foam material sample is also determined and the density is calculated using the formula density=weight/volume. The density of the uncompressed foam material is thus determined in accordance with the ISO 845 (g/$cm^3$) or ASTM D 3574-11A (lb/$ft^3$) standards. If the porous body in the chamber of the foam dispenser is compressed, the density increases accordingly by the degree of compression. To calculate the density, reference is made in the present case to the volume that the porous body has in the chamber when in the compressed state.

Number of Pores

The number of pores is determined microscopically. For this purpose, a straight line is made along one surface of the foam material and the number of pores along this line is counted over a distance of 1 inch.

Pore Size

The pore size is determined in accordance with ASTM D 3576-2004. For this purpose, a thin layer of foam material of a defined size is cut and placed in a special projector. The projector projects the sample together with a reference line. The length of the reference line is specified in millimeters. The number of cells that are intersected by the reference line is counted. The mean pore size is calculated from the length of the reference line and the number of pores.

BRIEF DESCRIPTION OF THE DRAWINGS

The invention is explained in more detail with reference to the Figures. The Figures show.

DETAILED DESCRIPTION

Figure 1:
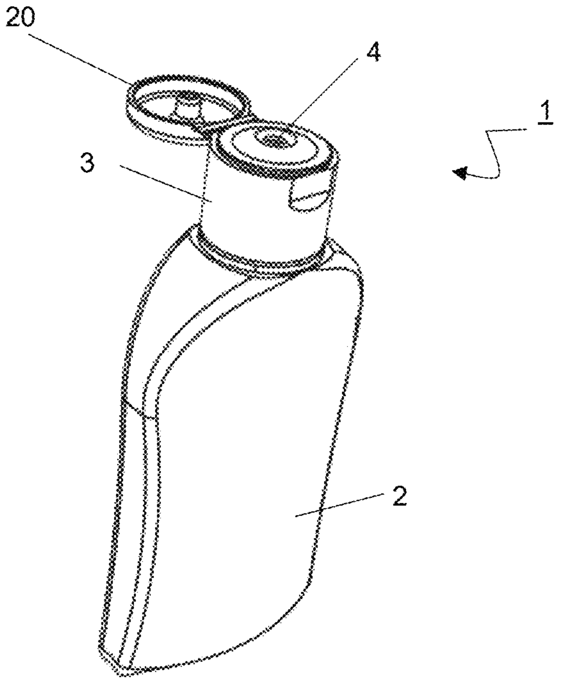
FIG. 1 shows an embodiment of a foam dispenser according to the invention in a perspective view.

FIG. 1 shows a foam dispenser according to the invention which is used to generate foam in an upside down position. The foam dispenser 1 comprises a bottle 2 with a closure cap 3 screwed onto the bottle. The closure cap is formed here as a hinged cap with a hinged lid 20. A dispensing opening 4 is arranged on the top side of the closure cap 3. A foam-generating device (not shown here) is located inside the closure cap.

Figure 2:
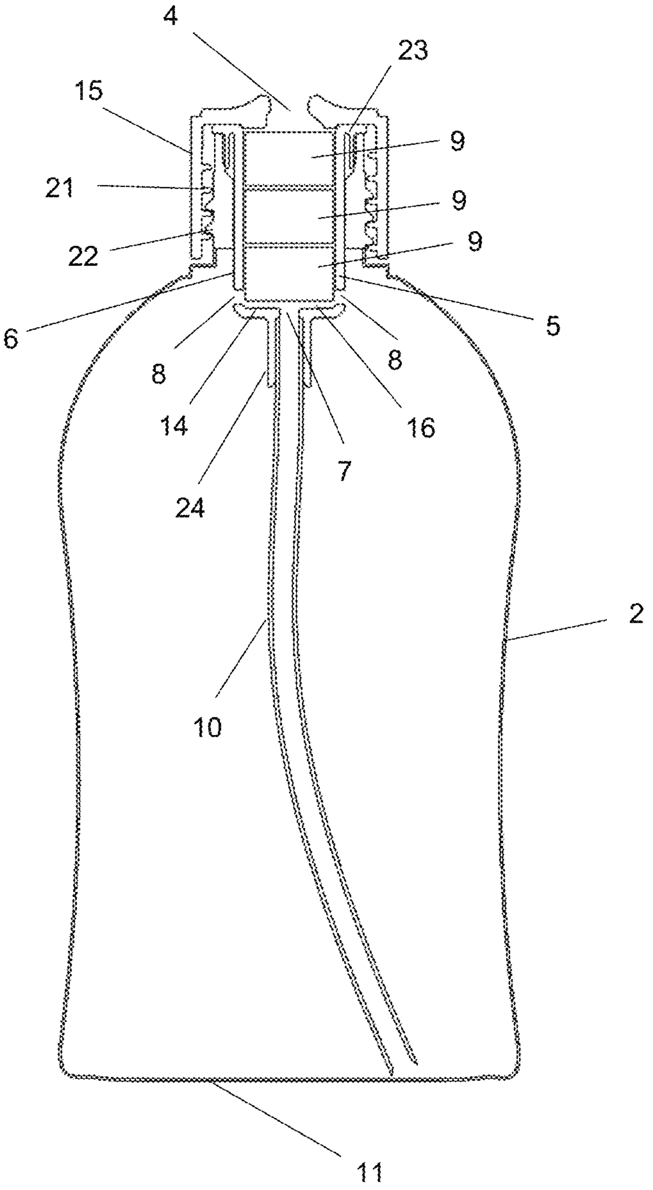
FIG. 2 shows a sectional view of a foam dispenser according to the invention.

FIG. 2 shows a first embodiment of a foam dispenser according to the invention in a sectional view. The foam dispenser 1 is designed to generate foam in an upside down position. The foam dispenser comprises a bottle 2, which is closed with a closure cap 3. The closure cap is designed as a screw cap with an internal thread 21 that is screwed to the external thread 22 on the neck of the bottle. A chamber 5 is arranged in the closure cap 3, in which chamber three porous bodies 9 are placed one above the other. The porous bodies 9 lie against the wall 6 of the chamber 5 so that no liquid can flow past the porous bodies 9 to the dispensing opening 4. There is an inlet 7 on the underside of the chamber 5, which inlet is connected to a riser pipe 10. The riser pipe 10 extends from the inlet 7 at the base of the chamber to the base of the bottle 11. The chamber has two inlets 8 lying opposite of each other in the side walls. The chamber is designed as a single-walled hollow cylinder having a flange 23 on its top side. The flange 23 rests on the neck of the bottle and is fixed in position by the closure cap 3. The top side of the chamber 5 is open and directed towards the dispensing opening 4, with which it is fluidly connected.

Figure 3:
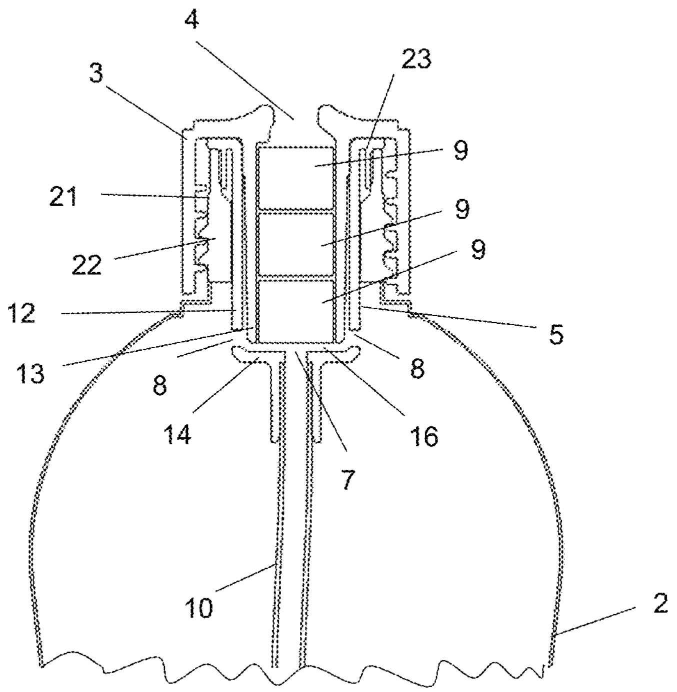
FIG. 3 shows a second embodiment of a foam dispenser according to the invention in a sectional view.

FIG. 3 shows a section of a foam dispenser in a second embodiment. The foam dispenser 1 shown in FIG. 3 is also designed to generate foam in an upside down position. In this embodiment, the chamber 5 is double-walled and has the shape of a double-walled hollow cylinder. The chamber has an inner cylinder 13 and an outer cylinder 12, which are arranged concentrically to each other in the overlapping area. The inner cylinder 13 is connected to the cover 15 of the closure cap 3 and is made from a single piece together with the latter. The three porous bodies 9 are arranged one above the other in the inner cylinder 13 and are each flush with the wall of the inner cylinder 13, so that no liquid can flow past the porous body 9. The inner cylinder 13 extends to the dispensing opening so that the foam is dispensed through the dispensing opening when it leaves the inner cylinder. The inner cylinder 13 has a shorter length compared to the outer cylinder 12. In the lower area of the chamber 5, directed towards the chamber base 14, the chamber is thus only single-walled. The outer cylinder 12 is connected to the chamber base 14 and has a flange 23 on its top side. The inlet 7 is located in the chamber base 14 and is fluidly connected to the riser pipe 10. The riser pipe 10 is held in a riser pipe holder 24.

Figure 4:
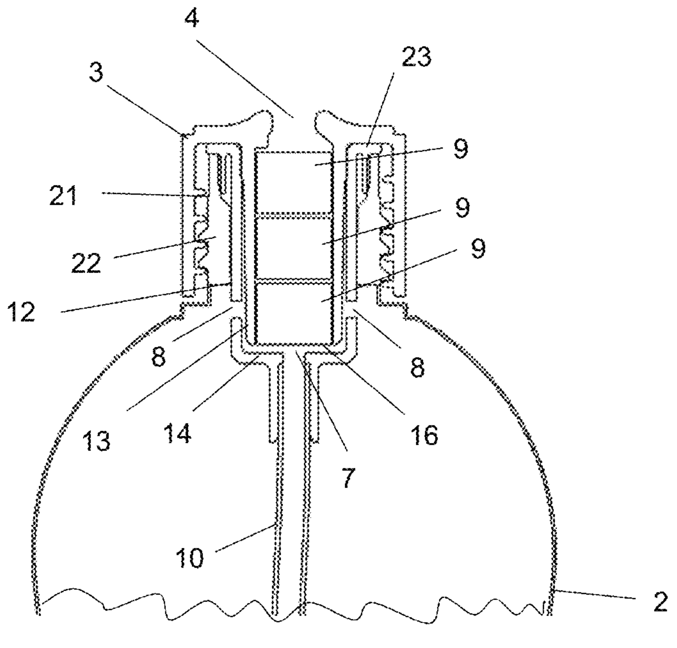
FIG. 4 shows a third embodiment of a foam dispenser according to the invention in a sectional view.

FIG. 4 shows a section of a foam dispenser in a third embodiment. The foam dispenser 1 shown in FIG. 4 is also designed to generate foam in an upside down position. In this embodiment, the chamber 5 is also double-walled and has the shape of a double-walled hollow cylinder. The foam dispenser shown in FIG. 4 differs from the foam dispenser shown in FIG. 3 in the position of the inlets 8 in the wall 6 of the chamber. In the third embodiment, the inlets 8 are located in the side wall 6 of the chamber above the chamber base 14 and at the level of the inner cylinder 13, so that during use the liquid first flows into the intermediate space 16 between the two cylinders, mixes with the air from the inlet 7 in the area below the inner cylinder 13 and is transported from there into the porous bodies 9.

Figure 5:
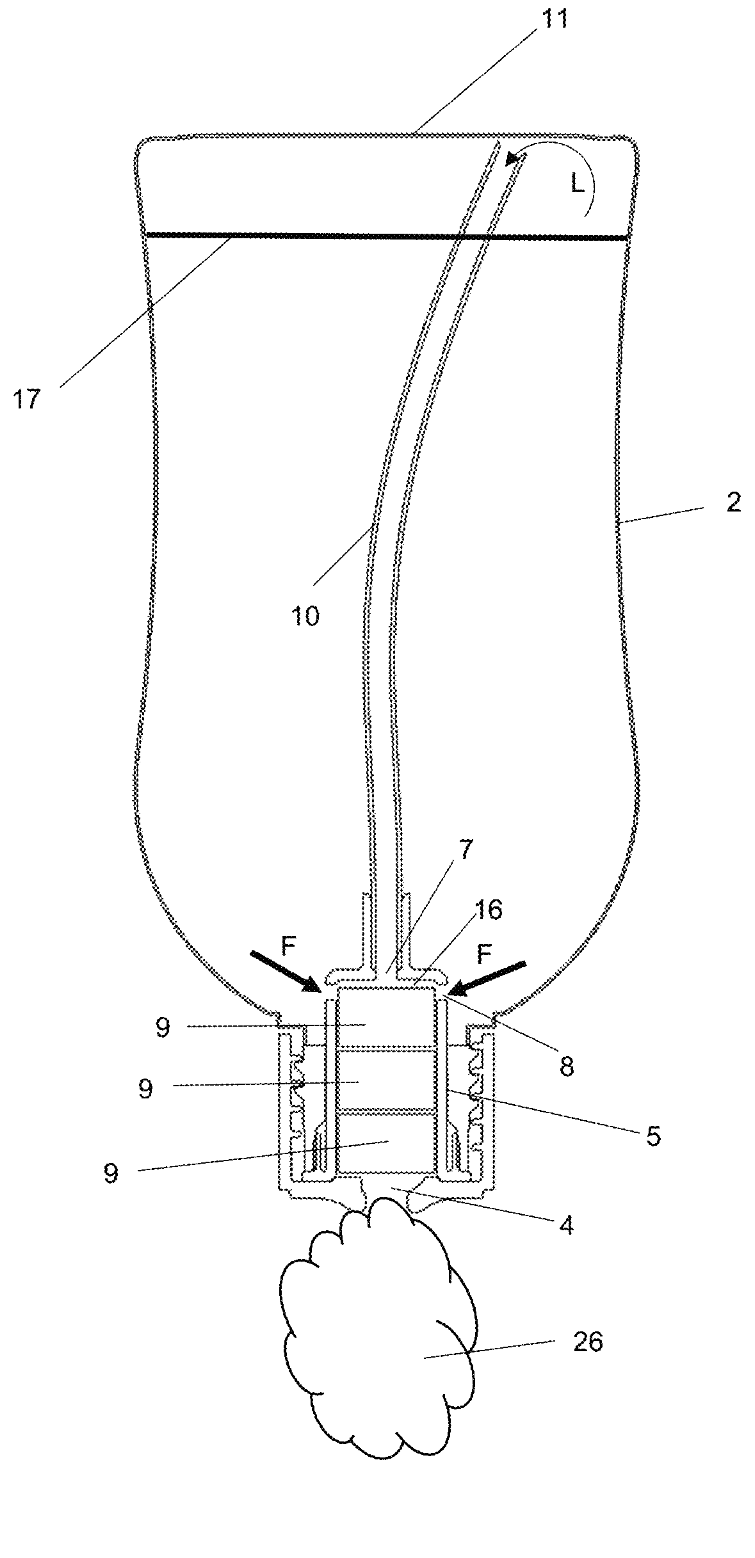
FIG. 5 shows a foam dispenser according to the invention as shown in FIG. 2 during foam generation.

FIG. 5 shows a sectional view through a foam dispenser according to the invention as shown in FIG. 2 when used in an upside down position. The hinged lid 20 of the bottle 2 is open and the bottle is turned upside down so that the base of the bottle 11 is facing upwards and the dispensing opening 4 is facing downwards. The inlet openings 8 of the chamber 5 lie below the liquid level 17 inside the bottle. The riser pipe 10 ends in the air space of the bottle 2. When pressure is applied to the bottle body, the air is pressed down through the riser pipe 10 and the liquid is sucked in from the bottle through the inlet openings 8 into the chamber 5. The direction of movement of air and liquid is additionally illustrated by the arrows L and F. Air and liquid are mixed together in the porous bodies 9 and the foam produced is discharged downwards through the discharge opening.

Figure 6:
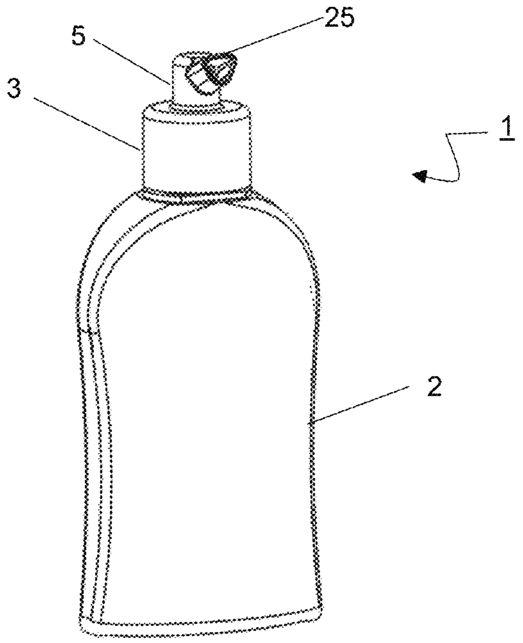
FIG. 6 shows a further embodiment of a foam dispenser according to the invention in a perspective view.

FIG. 6 shows a further embodiment of a foam dispenser 1 according to the invention in a perspective view. The foam dispenser 1 is designed to generate foam in an upright position and thus has a dispensing device 25 in the form of a spout on the closure cap 3, through which spout the foam is guided to the side after emerging from the dispensing opening 4.

Figure 7:
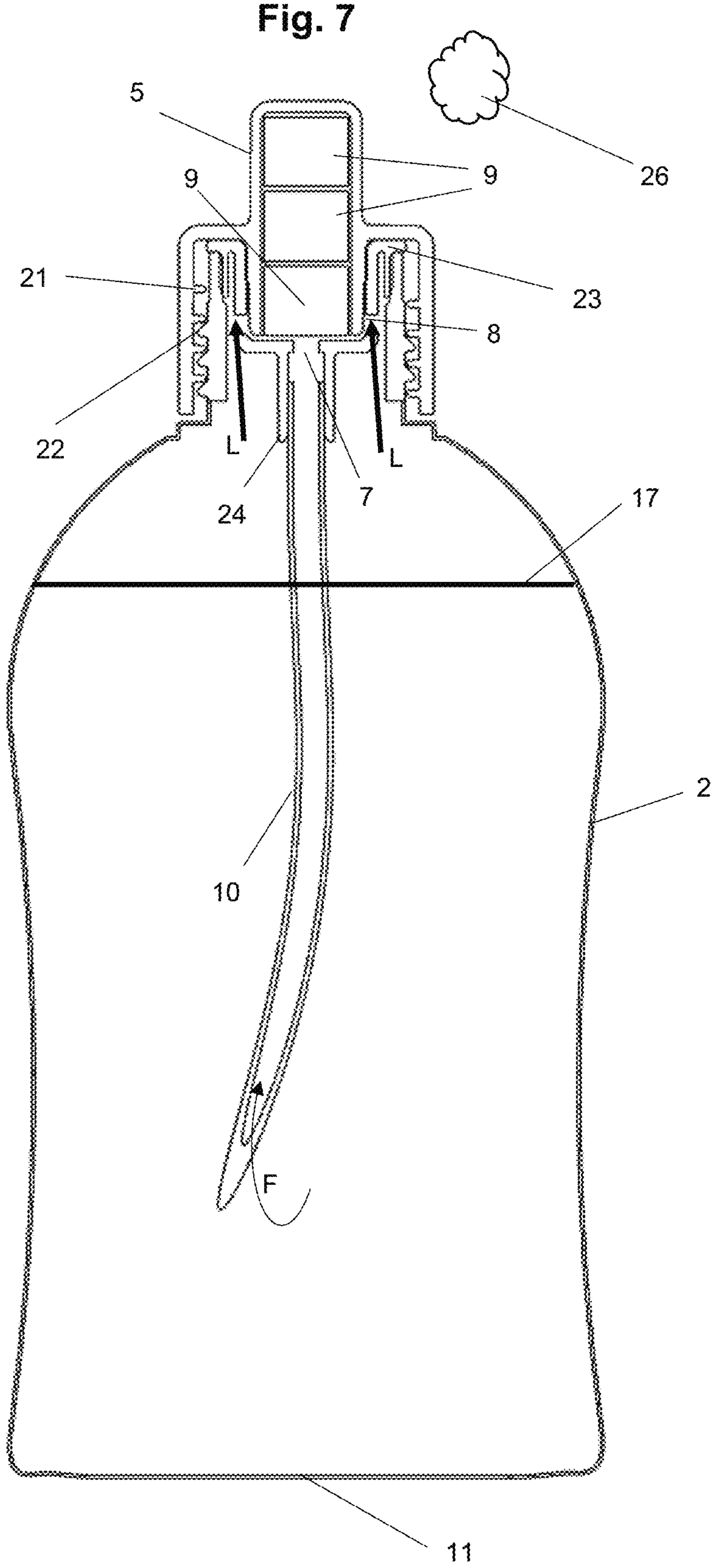
FIG. 7 shows a sectional view of the foam dispenser as shown in FIG. 6.

FIG. 7 shows a section through the foam dispenser from FIG. 6. The chamber 5 has an inner cylinder 13 and an outer cylinder 12, which are arranged concentrically to each other in the overlapping area. The inner cylinder 13 is offset upwards relative to the outer cylinder 12 along the longitudinal axis of the two cylinders towards the dispensing opening 4, so that the chamber protrudes upwards out of the bottle beyond the end of the bottle neck. The area of the chamber 5 at the chamber base 14 is only single-walled. The inner cylinder 13 contains three porous bodies 9, which are stacked one above the other and are flush with the wall of the inner cylinder 13. The chamber has a plurality of inlet openings 8, which lie above the liquid level 17 inside the bottle. The riser pipe 10, which is attached to the lower end of the chamber 5, extends to the base 11 of the bottle. When pressure is applied to the bottle body 2, the liquid is forced upwards through the riser pipe 10, sucking in air from the headspace of the bottle. Air and liquid are mixed together through the porous bodies 9 and the resulting foam is discharged upwards out of the dispensing opening. The dispensing opening 4 is moved to the side of the closure cap and is not shown here since it is located outside the sectional plane.

In all the embodiments shown, the side wall of the chamber can have further inlets that are located outside the sectional plane and are thus not shown.

EXAMPLES

A foam dispenser with a bottle size with a capacity of 100 ml and a structure similar to that shown in FIGS. 1 and 3 was tested with different chambers and different porous bodies. The cylindrical chambers, each with a volume of 1.45 $cm^3$, differed from each other in the number of inlets and the size of the inlet openings. With regard to the porous bodies, a different number of cylindrical porous bodies made of open-cell polyurethane with a density of 0.03 $g/cm^3$ in the uncompressed state, a pore count of 70 pores/inch±10 pores/inch in the uncompressed state and a volume of 0.57 $cm^3$ in the uncompressed state (based on a single porous body) were used. The porous bodies were compressed to varying degrees. Two porous bodies were not yet compressed (density unchanged at 0.03 $g/cm^3$). Three porous bodies had a compression around 16% (density was then increased to 0.036 $g/cm^3$). Four porous bodies had a compression around 37% (density was then increased to 0.047 $g/cm^3$).

Different embodiments of the foam dispenser were filled with different solutions, a high-alcohol solution, a low-alcohol solution and an aqueous cleaning formulation, in order to investigate foam generation, particularly with a high alcohol content of the foamable solution. The tested solutions had the following compositions:

Examples 1 to 24: Hand Sanitizer (Highly Alcoholic, Leave-on Product)

Ethanol 80%
Silicone surfactant 1%
Glycerine 0.50%
Tetradecanol 0.75%
optional foam stabilizer (only for examples 17 to 24)
Water ad 100

Examples 25 to 27: Aqueous Soap Formulation

Sodium lauryl sulfate (SLS) (surfactant) 2%
Citric acid (pH regulator) 0.50%
Water ad 100

Examples 28 to 30: Surface Disinfectant (Low Alcohol)

Ethanol 14%
1-Propanol 6%
2-Propanol 10%
N-alkylaminopropylglycine 0.50%
Water ad 100

Foam generation tests were carried out by turning the foam dispenser upside down and squeezing the bottle by hand until foam or liquid came out of the dispensing opening. The foam quality was assessed visually and haptically. The following values between 1 and 10 were assigned:

Value 1 to 4: no stable foam, possibly liquid with individual bubbles

Value 5 to 10: stable foam, recognizably higher viscosity than non-foamed solution, product suitable for customers Table 1 in the appendix summarizes the foam generation tests carried out and the evaluation of the foam quality. It can be seen that a stable foam can be produced with the foam dispenser according to the invention even with a high alcohol content of 80% by weight (foam quality value>5). The tested aqueous soap formulation without alcohol produced a very firm foam with high stability.

The invention is not limited to one of the embodiments described above, but can be modified in a variety of ways.

REFERENCE SYMBOL LIST

Foam dispenser 1
Plastic bottle 2
Closure cap 3
Dispensing opening 4
Chamber 5
Wall 6
Inlet 7
Inlet 8
Porous body 9
Riser pipe 10
Bottle base 11
Outer cylinder 12
Inner cylinder 13
Chamber base 14
Cover of the closure cap 15
Intermediate space 16

Liquid level 17
Cap 20
Internal thread 21
External thread 22
Flange 23
Riser pipe holder 24
Dispensing device 25
Foam 26
Air flow L
Liquid flow F

TABLE 1

| Example no. | Density foam material g/cm$^3$ | Density lb/ft$^3$ | Number of porous bodies | Number of inlets in chamber wall | Diameter of inlet in chamber wall [mm] | Total area of inlets in chamber wall [mm$^2$] | Number of inlets in chamber base | Diameter of inlet in chamber base [mm] | Total area of inlets in chamber base [mm$^2$] | Ratio of total area of inlets for air:Inlets for liquid | Foam quality |
|---|---|---|---|---|---|---|---|---|---|---|---|
| 1 | 0.030 | 1.9 | 2 | 3 | 0.8 | 1.508 | 1 | 1.0 | 0.785 | 1:1.92 | 3.0 |
| 2 | 0.030 | 1.9 | 2 | 4 | 0.8 | 2.011 | 1 | 1.0 | 0.785 | 1:2.56 | 3.0 |
| 3 | 0.030 | 1.9 | 2 | 3 | 0.8 | 1.508 | 1 | 1.2 | 1.131 | 1:1.33 | 3.5 |
| 4 | 0.030 | 1.9 | 2 | 4 | 0.8 | 2.011 | 1 | 1.2 | 1.131 | 1:1.78 | 3.5 |
| 5 | 0.030 | 1.9 | 2 | 4 | 0.8 | 2.011 | 1 | 1.4 | 1.539 | 1:1.31 | 2.0 |
| 6 | 0.036 | 2.2 | 3 | 3 | 0.6 | 0.848 | 1 | 1.2 | 1.131 | 1:0.75 | 7.0 |
| 7 | 0.036 | 2.2 | 3 | 4 | 0.6 | 1.131 | 1 | 1.2 | 1.131 | 1:1.00 | 5.0 |
| 8 | 0.036 | 2.2 | 3 | 3 | 0.8 | 1.508 | 1 | 1.2 | 1.131 | 1:1.33 | 5.5 |
| 9 | 0.036 | 2.2 | 3 | 4 | 0.8 | 2.011 | 1 | 1.2 | 1.131 | 1:1.78 | 6.0 |
| 10 | 0.036 | 2.2 | 3 | 3 | 0.8 | 1.508 | 1 | 1.4 | 1.539 | 1:0.98 | 5.0 |
| 11 | 0.047 | 2.9 | 4 | 4 | 0.6 | 1.131 | 1 | 1.2 | 1.131 | 1:1.00 | 7.5 |
| 12 | 0.047 | 2.9 | 4 | 3 | 0.8 | 1.508 | 1 | 1.2 | 1.131 | 1:1.33 | 7.0 |
| 13 | 0.047 | 2.9 | 4 | 4 | 0.8 | 2.011 | 1 | 1.2 | 1.131 | 1:1.78 | 5.0 |
| 14 | 0.047 | 2.9 | 4 | 3 | 0.8 | 1.508 | 1 | 1.4 | 1.539 | 1:0.98 | 6.0 |
| 15 | 0.047 | 2.9 | 4 | 4 | 0.8 | 2.011 | 1 | 1.0 | 0.785 | 1:2.56 | 5.0 |
| 16 | 0.047 | 2.9 | 4 | 4 | 0.8 | 2.011 | 1 | 1.4 | 1.539 | 1:1.31 | 5.0 |
| 17 | 0.036 | 2.2 | 3 | 4 | 0.7 | 1.539 | 1 | 1.0 | 0.785 | 1:1.96 | 7.0 |
| 18 | 0.036 | 2.2 | 3 | 4 | 0.6 | 1.131 | 1 | 1.0 | 0.785 | 1:1.44 | 6.0 |
| 19 | 0.036 | 2.2 | 3 | 5 | 0.6 | 1.414 | 1 | 1.0 | 0.785 | 1:1.80 | 5.0 |
| 20 | 0.036 | 2.2 | 3 | 2 | 0.8 | 1.005 | 1 | 1.0 | 0.785 | 1:1.28 | 7.0 |
| 21 | 0.036 | 2.2 | 3 | 4 | 0.6 | 1.131 | 1 | 1.2 | 1.131 | 1:1.00 | 6.5 |
| 22 | 0.036 | 2.2 | 3 | 3 | 0.8 | 1.508 | 1 | 1.2 | 1.131 | 1:1.33 | 6.5 |
| 23 | 0.047 | 2.9 | 4 | 4 | 0.6 | 1.131 | 1 | 1.2 | 1.131 | 1:1.00 | 5.0 |
| 24 | 0.047 | 2.9 | 4 | 3 | 0.8 | 1.508 | 1 | 1.2 | 1.131 | 1:1.33 | 7.5 |
| 25 | 0.036 | 2.2 | 3 | 3 | 0.6 | 0.848 | 1 | 1.2 | 1.131 | 1:0.75 | 9.5 |
| 26 | 0.036 | 2.2 | 3 | 4 | 0.6 | 1.131 | 1 | 1.2 | 1.131 | 1:1.00 | 9.5 |
| 27 | 0.036 | 2.2 | 3 | 3 | 0.8 | 1.508 | 1 | 1.2 | 1.131 | 1:1.33 | 9.5 |
| 28 | 0.036 | 2.2 | 3 | 3 | 0.6 | 0.848 | 1 | 1.2 | 1.131 | 1:0.75 | 6.0 |
| 29 | 0.036 | 2.2 | 3 | 4 | 0.6 | 1.131 | 1 | 1.2 | 1.131 | 1:1.00 | 6.5 |
| 30 | 0.036 | 2.2 | 3 | 3 | 0.8 | 1.508 | 1 | 1.2 | 1.131 | 1:1.33 | 6.0 |

The invention claimed is:

1. A foam dispenser, comprising:

a plastic bottle made of flexible plastic having a bottle opening;

a closure cap which seals the bottle opening and has a dispensing opening for a foam;

a foam-generating device for foaming a solution; and a riser pipe which is arranged inside the plastic bottle, wherein the foam-generating device comprises a chamber having at least one wall, at least one inlet for air connected to the riser pipe in a chamber base, at least one inlet for liquid in at least one chamber wall, and at least one foam body which is arranged in the chamber, wherein the foam-generating device is arranged in or connected to the closure cap, wherein the at least one foam body consists of an open-cell foam material and the open-cell foam material has a density of more than 0.03 g/cm3, wherein the chamber, which is at least partially cylindrical, has the chamber base and the at least one chamber wall which extends from the chamber base in a direction of the bottle opening, and wherein the at least one foam body fills the volume of the chamber to at least 80%.

2. The foam dispenser according to claim 1, wherein the at least one foam body is compressed in the chamber.

3. The foam dispenser according to claim 1, wherein the plastic bottle contains an alcoholic solution.

4. The foam dispenser according to claim 3, wherein the alcoholic solution is an alcoholic disinfectant.

5. The foam dispenser according to claim 1, wherein the foam has a density of at least 0.035 g/cm$^3$.

6. The foam dispenser according to claim 1, wherein the foam has a density of at most 0.08 g/cm$^3$.

7. The foam dispenser according to claim 1, wherein the foam in an uncompressed state has a number of pores of 50 to 130 pores/inch, of 60 to 100 pores/inch, or of about 70 pores/inch.

8. The foam dispenser according to claim 1, wherein the foam in an uncompressed state has a pore size of 0.3 mm to 0.9 mm, measured according to ASTM D 3576-2004.

9. The foam dispenser according to claim 1, wherein the at least one foam body is fixed to the wall of the chamber and the at least one foam body is in full contact with the wall of the chamber.

10. The foam dispenser according to claim 1, wherein the at least one foam body is cylindrical.

11. The foam dispenser according to claim 1, wherein the chamber has only a single inlet in the chamber base, wherein the single inlet is connected to the riser pipe and forms the at least one inlet for the air.

12. The foam dispenser according to claim 1, wherein the chamber has at least two inlets in a side wall of the chamber and, wherein the at least two inlets are arranged evenly spaced apart and form the at least one inlet for the liquid.

13. The foam dispenser according to one claim 1, wherein the chamber is at least partially designed as a double-walled hollow cylinder and has an inner and an outer cylinder which are arranged concentrically to each other in an overlapping area.

14. The foam dispenser according to claim 1, wherein a ratio of a size of the at least one inlet for air to a ratio of a size of the at least one inlet for liquid is 1:0.9 to 1:1.5.

15. A method for foaming an alcoholic solution, comprising;

providing the foam dispenser according to claim 1, wherein the foam dispenser contains the alcoholic solution; and manually squeezing the plastic bottle of the foam dispenser so that an alcoholic foam can be obtained.

16. The foam dispenser according to claim 1, wherein the at least one foam body is compressed in the chamber by 10% to 50%.

17. The foam dispenser according to claim 1, wherein the foam has a density of at least 0.045 g/$cm^3$.

18. The foam dispenser according to claim 1, wherein the foam has a density of at most 0.06 g/$cm^3$.

19. The foam dispenser according to claim 1, wherein the foam in the uncompressed state has a number of pores of 60 to 100 pores/inch.

* * * * *